UNITED STATES PATENT OFFICE.

THADDEUS C. TUCKER, OF OAKLAND, CALIFORNIA.

PROCESS OF SALTING NUTS IN THE SHELL.

1,397,187.      Specification of Letters Patent.      Patented Nov. 15, 1921.

No Drawing.      Application filed June 23, 1921. Serial No. 479,869.

*To all whom it may concern:*

Be it known that I, THADDEUS C. TUCKER, a citizen of the United States, and a resident of the city of Oakland, county of Alameda, State of California, have made a new and useful invention—to wit, Improvements in Processes of Salting Nuts in the Shell; and I do hereby declare the following to be a full, clear, concise, and exact description of the same.

This invention relates particularly to a process for and the method of salting nuts, and particularly almonds, in the shell.

An object of this invention relates to the process of salting almonds or other nuts having a pervious shell in the shell, to impregnate the nut or almond meats with a salty flavor, after which the nut or almond in the shell would be roasted. The kernels of nuts or almonds in the shells treated after the manner of my invention are thus provided with an agreeable salty flavor, imparted under conditions insuring cleanliness and purity and also better preserving and protecting the product. It is a further object that the process be superior from a point of simplicity, positiveness of operation and general efficiency. Other objects and advantages will appear as this description progresses.

In this specification the invention is described in the form considered to be the best, but it is to be understood that the invention is not limited to such form, because it may be embodied in other forms, and it is also to be understood that in and by the claims following the description it is desired to cover the invention in whatsoever form it may be embodied. Although the process and method of treating nuts in the shell has been arranged especially for impregnating almonds in the shell with a salty flavor, I do not wish to be limited solely to the treatment of almonds in the shell as the scope of this invention contemplates that other varieties of nuts in the shell may be treated in the same manner.

In treating almonds in the shell according to my invention, an open kettle or vat is provided containing a solution concentrated or highly impregnated with salt or any suitable saline derivative and the said solution preferably brought to a boiling point at or about 212° Fahrenheit either by the flame of a gas or oil jet applied to the exterior of the kettle or vat or by inserting a steam jet into the concentrated solution. Experiments have determined that either of the named methods of heating the solution to the predetermined temperature are conducive to the most efficient results in the operation of the process, although it is to be understood that any other manner or method of heating the solution to the desired temperature would be the substantial equivalent of those named. The nuts or almonds in the shell or articles to be treated are placed in a porous, foraminated or similar screen container and immersed in the boiling saline solution. During the period of immersion (which experiments have determined should extend for a duration of time closely approximating five minutes), the screen container is continually moved to thus agitate, turn and move the nuts therein contained and allowing the air to escape from the cranks or pores in the shells thereby producing a more uniform salting of the nut or almond meat or kernel. It has been found that by placing nuts or almonds in the shell in a boiling solution concentrated or impregnated with salt for approximately a period of five minutes and continually agitating the same while in the solution the nut meats are flavored with an agreeable salty flavor. Where the nuts or almonds in the shell are permitted to stay in the solution for a longer period from that designated, the shells are discolored and toughened and the quality of the nut meat subjected to deleterious effects, and the quality of the same impaired by making it indigestible.

This method of salting nuts or almonds in the shell is more efficacious than those processes wherein it is necessary to remove the nut meat from the shell and then salt it by any of a number of known processes. Such processes do not insure the same cleanliness and purity of nut meat or kernel but tend to make it a tough and indigestible product.

As a further step in the process, it has been found that the impregnation is materially hastened by maintaining a pressure on the liquid sufficient to aid in the penetration of the shell. Such pressure may vary, as between ten and seventy five pounds above atmospheric, according to the degree of permeability of the shell to secure the desired degree of impregnation in such time as to produce very little discoloration of the shell.

After the nuts or almonds in the shell have been treated in the solution for the desired period (five minutes) the screen container holding the same is removed from the kettle or vat and the said nuts or almonds in the shell then subjected to a drying bath, for the purpose of evaporizing the solution clinging to or held in the porous walls of the shell. The nuts are thus dried and then roasted in any suitable nut roasting apparatus in the customary manner.

Various modifications of this process suggest themselves which have not proven to be as satisfactory or as efficient as the method and process first described. For instance, it is possible to immerse or soak almonds in the shell in a cold or luke-warm saline solution for a predetermined period according to the thickness of the almond shell and the degree of flavor desired to be imparted to the nut meat after which the treated almond in the shell would be roasted in any suitable manner. As a reversal of this process, it is possible to first roast the almonds in the shell and then immerse or soak the same in a cold, luke-warm or boiling saline or salt solution for a predetermined period of time necessary to produce the required salty flavor on the nut meat which would be governed in a measure by the thickness of the nut shell. Each of these last named processes tends to discolor the shell of the nut and to reduce the desired quality of the nut meat and for that reason are not as desirable as the method wherein the nuts or almonds in the shell are immersed in a boiling solution impregnated with salt.

Having thus described this invention, what I claim and desire to secure by Letters Patent is:

1. The herein described process for salting unshelled almonds or other nuts having shells pervious to a saline solution comprising immersing said nuts in a saline solution held at normal boiling temperature and for a period sufficient to secure penetration of the shell and agitating same during the period of immersion.

2. The herein described process for salting unshelled almonds or other nuts having shells pervious to a saline solution comprising immersing said nuts in a saline solution held at normal boiling temperature and for a period sufficient to secure penetration of the shell, agitating same during the period of immersion, and drying and roasting said nuts.

3. The herein described process for salting unshelled almonds or other nuts having shells pervious to a saline solution comprising immersing said nuts in a saline solution held at normal boiling temperature and for a period sufficient to secure penetration of the shell, agitating same during the period of immersion, and maintaining a substantial pressure on said solution in the process.

4. The herein described process for salting unshelled almonds or other nuts having shells pervious to a saline solution comprising immersing said nuts in a saline solution of sodium chlorid, said solution being held at a temperature of substantially 212° F. and for a period of substantially five minutes, agitating same and maintaining a substantial pressure on said solution during the period of immersion.

In testimony whereof, I have hereunto set my hand at San Francisco, California, this 17th day of June, 1921.

THADDEUS C. TUCKER.

In presence of—
T. B. WATERS.